United States Patent [19]

Maynard

[11] 3,914,674
[45] Oct. 21, 1975

[54] D.C. MOTOR CONTROL HAVING GATING CONTROL OF A FULL-WAVE REACTIFIER SYSTEM

[75] Inventor: John T. Maynard, New Berlin, Wis.
[73] Assignee: Armor Elevator Company, Louisville, Ky.
[22] Filed: May 10, 1974
[21] Appl. No.: 468,860

[52] U.S. Cl. ................................. 318/331; 318/345
[51] Int. Cl.² ........................................... H02P 5/16
[58] Field of Search ....... 187/29; 318/331, 341, 345

[56] References Cited
UNITED STATES PATENTS

| | | | |
|---|---|---|---|
| 3,668,493 | 6/1972 | Maynard | 318/345 |
| 3,675,104 | 7/1972 | Allison et al. | 318/345 |
| 3,716,771 | 2/1973 | Maynard | 318/331 |
| 3,795,850 | 3/1974 | Grygera | 318/331 |

Primary Examiner—Robert K. Schaefer
Assistant Examiner—W. E. Duncanson, Jr.
Attorney, Agent, or Firm—Andrus, Sceales, Starke & Sawall

[57] ABSTRACT

A D.C. motor is selectively connected to receive energizing power from a polyphase power source through a dual bridge rectifying system providing full-wave rectification and selectively operable to supply current of either polarity for motoring in either direction and regenerative operation. An improved gating control system includes a plurality of gating channels each operative for supplying gating pulses to one of the rectifying elements. Each channel includes three cascaded solid-state switching circuits operating in response to an analog output of a summing circuit receiving a compensated error signal, an alternating phase reference signal, and a constant reference signal for properly controlling the firing angle of the associated controlled rectifier. An input switching transistor circuit is connected to receive the analog output of the summing circuit and an output switching Darlington pair circuit selectively operates to operatively connect a storage capacitor to a primary winding of an output transformer having a secondary windng directly connected to the gating and cathode circuits of the controlled rectifier through insulated output leads. An intermediate switching Darlington pair circuit is connected between the input and output switching circuits and provides an output circuit in one channel connected to an input circuit of an output switching circuit in another channel so that the two inter-related channels will both render the associated rectifying devices conductive to energize the D.C. motor. Disable signals relating to the error signal polarity and the relative phase polarity are supplied to the input circuit of the intermediate switching circuit to disable the associated controlled rectifier.

15 Claims, 5 Drawing Figures

SOURCE VOLTAGE WAVE FORMS

Fig.4

PHASE REFERENCE SIGNAL

Fig.5

DISABLE REFERENCE SIGNAL

D.C. MOTOR CONTROL HAVING GATING CONTROL OF A FULL-WAVE REACTIFIER SYSTEM

BACKGROUND OF THE INVENTION

This invention relates to a dynamo-electric control circuit and particularly to an improved gating control circuit for selectively controlling the conduction of a plurality of individual rectifier devices and thus the energization of a direct current motor from a polyphase power supply to maintain a regulated motor output.

Direct current motors and the like are employed in control and drive systems and generally include some form of a feedback system to control the input power to the motor and thereby the motor speed or output. A direct current shunt motor is highly desirable where a highly regulated speed is desired with a high starting torque and is particularly desirable for controlling the operation of a transportation system such as an elevator. Some shunt type motors have been energized by a variable potential source such as a motor-generator set in which the variable voltage output supplied from the generator to the direct current motor is controlled for controlling the speed and torque characteristics while maintaining the D.C. motor shunt field with a fixed field excitation.

Some D.C. motor control systems used for industrial applications such as in steel mill processes or the like have controlled the voltage supplied to an armature circuit through solid-state devices such as silicon controlled rectifiers of either the unilateral or bilateral conduction variety both of which allow effective varying of the connection of a polyphase voltage supply to the armature circuit. Such systems have been automatically operated to provide motoring and regenerating modes of operation.

One known system has employed a plurality of gate drivers each connected to two associated controlled rectifiers through steering diodes and other protective circuitry for selectively rendering the controlled rectifiers conductive, such as illustrated in the U.S. Pat. No. 3,535,610 issued to J. Maynard on Oct. 20, 1970. Such gate drivers each include a two stage switching transistor circuit connected to receive a firing control signal from a switching circuit such as a monostable circuit for selectively discharging stored energy in a capacitor through a primary winding of an output transformer having a pair of output windings connected through the steering diodes to supply a pair of gating pulses to the pair of corresponding controlled rectifier devices for completing an energizing circuit for the D.C. motor.

Another known system which may be used with U.S. Pat. No. 3,535,610 uses an analog control which sums an analog command signal with an analog feedback signal to provide a summated error signal which, in turn, is summed with a signal in accordance with the counter electro-motive force of the direct current dynamo-electric load to control the application of power to the armature, such as shown in the U.S. Pat. No. 3,716,771 issued to J. Maynard on Feb. 13, 1973. The summated output control signal in such system is interconnected to actuate a gating regulating circuit which, in turn, operates gate drivers such as in U.S. Pat. No. 3,535,610. The gate regulating circuit in U.S. Pat. No. 3,716,771 includes an intercept detector having a plurality of switching transistors connected to an input summing circuit receiving a constant reference signal, an alternating phase reference signal supplied from the power supply and the summated control signal derived from the error signal. The intercept detector is coupled to a two input NOR circuit constituting a second switching circuit which, in turn, is connected to operate a two input mono-stable switching circuit. One input to the two input NOR circuit is supplied from a zero detector coupled to sense the polarity of a phase of the alternating power supply and selectively supplying disable signals to the NOR circuit. One input to the mono-stable circuit is connected to receive disable signals from a polarity detector connected to sense the relative polarity of the error signal.

Other systems have utilized a gating control circuit such as in the U.S. Pat. No. 3,551,782 to J. Maynard issued on Dec. 29, 1970 which employs a four input NOR circuit for providing a highly desirable cross-over control or as shown in the U.S. Pat. No. 3,668,493 to J. Maynard issued on June 6, 1972 which employs highly desirable lead and lag filtering networks for supplying an alternating reference signal from the power supply to an intercept detector which, in turn, is coupled to an input of a switching circuit also receiving inputs from a polarity detector and a zero detector for controlling a gate driver as illustrated in U.S. Pat. No. 3,535,610.

SUMMARY OF THE INVENTION

This invention relates to a motor control circuit for energizing a D.C. motor from a polyphase power supply to maintain a regulated motor output by an improved and highly desirable gating system.

A plurality of individual rectifier means are connected to the power supply in a full-wave rectifying system wherein each of the rectifier means is selectively fired during a given half cycle of the alternating current input and commutates during the successive half cycle of the alternating current input to supply a controlled varying energization of the D.C. motor. A highly desirable and improved pulse generating circuit is provided for gating the individual rectifier means and includes a plurality of gating control channels each corresponding to one of the controlled individual rectifier means. Thus each channel operatively supplies a gating pulse to one of the rectifier means and includes a first switching circuit having a first input operatively receiving a selectively variable firing control signal and providing a first output selectively operable from a first condition to a second condition in response to the firing control signal. The output of the first switching means is connected to a second input of a second switching circuit which, in turn, provides an output selectively operable from a first condition to a second condition in response to the first switching means operating to its second condition. The second output of the second switching circuit when transferred to its second condition operatively supplies an output pulse to the associated rectifier means. In addition, the first output of the first switching means for each channel is connected to a second input of a second switching circuit of another channel for operating the other channel and supplying an output pulse to the associated rectifier means of the other channel.

The highly desirable gating control system employs a number of circuit channels each corresponding to an associated controlled rectifier with each channel effective for rendering two of the controlled rectifiers conductive without requiring steering diodes and protective circuitry interconnecting the gating control channels with the controlled rectifiers, such as provided in the Maynard U.S. Pat. No. 3,535,610.

The highly desirable gating control circuit provides the plurality of gating control channels each of which employs an output transformer having a primary winding connected to be actuated by the second switching circuit and further connected to an energy storage means such as a capacitive element while providing an output winding directly connected to the gating and cathode circuits of the controlled rectifier through a pair of insulated conducting leads. The highly desirable and novel method of providing a low impedance output which is completely insulated for supplying gating pulses to render the controlled rectifiers conductive eliminates the necessity of interconnecting the output transformer secondary windings to two or more controlled rectifiers through steering diodes and the like. Such a low impedance insulated output also eliminates the necessity of connecting capacitive and other impedance elements to the gating and cathode circuits of a controlled rectifier and provides a highly efficient and economical gating control system.

The first input to the above described first switching circuit is also connected to selectively receive first enable and disable signals from a sensing circuit which is coupled to monitor the polarity of an error signal supplied from a signal-forming means and related to the output of the motor and a desired output. The polarity of the error signal is sensed so that the proper operating bridge network may be operated for supplying either forward or reverse direction energy to the D.C. motor to provide the selected direction of motoring or regenerating as commanded. Second enable and disable signals are also selectively interconnected to the above defined first input of the first switching circuit as supplied from the power supply through a lag filter network. The disable signal is related to the phase relationship of the polyphase source and permits a controlled rectifier to be rendered conductive only during one hundred and eighty electrical degrees of each power source cycle.

A third switching circuit is provided having a third input connected to operatively receive the error signal and having a third output connected to the first input of the first switching circuit. The third switching circuit operates in response to a plurality of input signals for transferring from a first condition to a second condition to condition a particular channel to supply a gating pulse to the associated controlled rectifier. A summing circuit is connected to the third input and is connected to receive the firing control signal together with an alternating reference signal related to the relative phase relationship of the polyphase supply. In addition, the summing circuit is connected to receive a constant reference signal which is combined with the alternating reference signal and the firing control signal to provide a high degree of control over the firing angle and thus the time duration of conduction for each controlled rectifier during each cycle of the alternating power supply.

In a preferred construction, the first and second switching circuits include Darlington pair type transistor circuits connected in a grounded emitter configuration having a base circuit connected as an input and a collector circuit connected as an output. In a highly desirable construction, the collector circuit of the first Darlington circuit within a channel is coupled to the base circuit of the second Darlington circuit within the same channel and to the base circuit of a second Darlington circuit in another channel for selectively rendering two controlled rectifiers conductive. The collector circuit of the first Darlington circuit is connected to a voltage dividing circuit connected to a voltage bias supply thus permitting the bias supply to be unregulated.

The highly desirable gating control system is capable of controlling the selective energization of a dual bridge rectifying system each providing full-wave rectification so that the system can provide a wide range of forward and reverse motoring as well as regenerative operation for the energization of a D.C. motor from a polyphase power supply.

BRIEF DESCRIPTION OF THE DRAWINGS

The drawings furnished herewith illustrate a preferred construction of the present invention in which the above advantages and features are clearly disclosed, as well as others which will be clear from the following description.

In the drawings.

DESCRIPTION OF THE PREFERRED ILLUSTRATED EMBODIMENT

Figure 1:
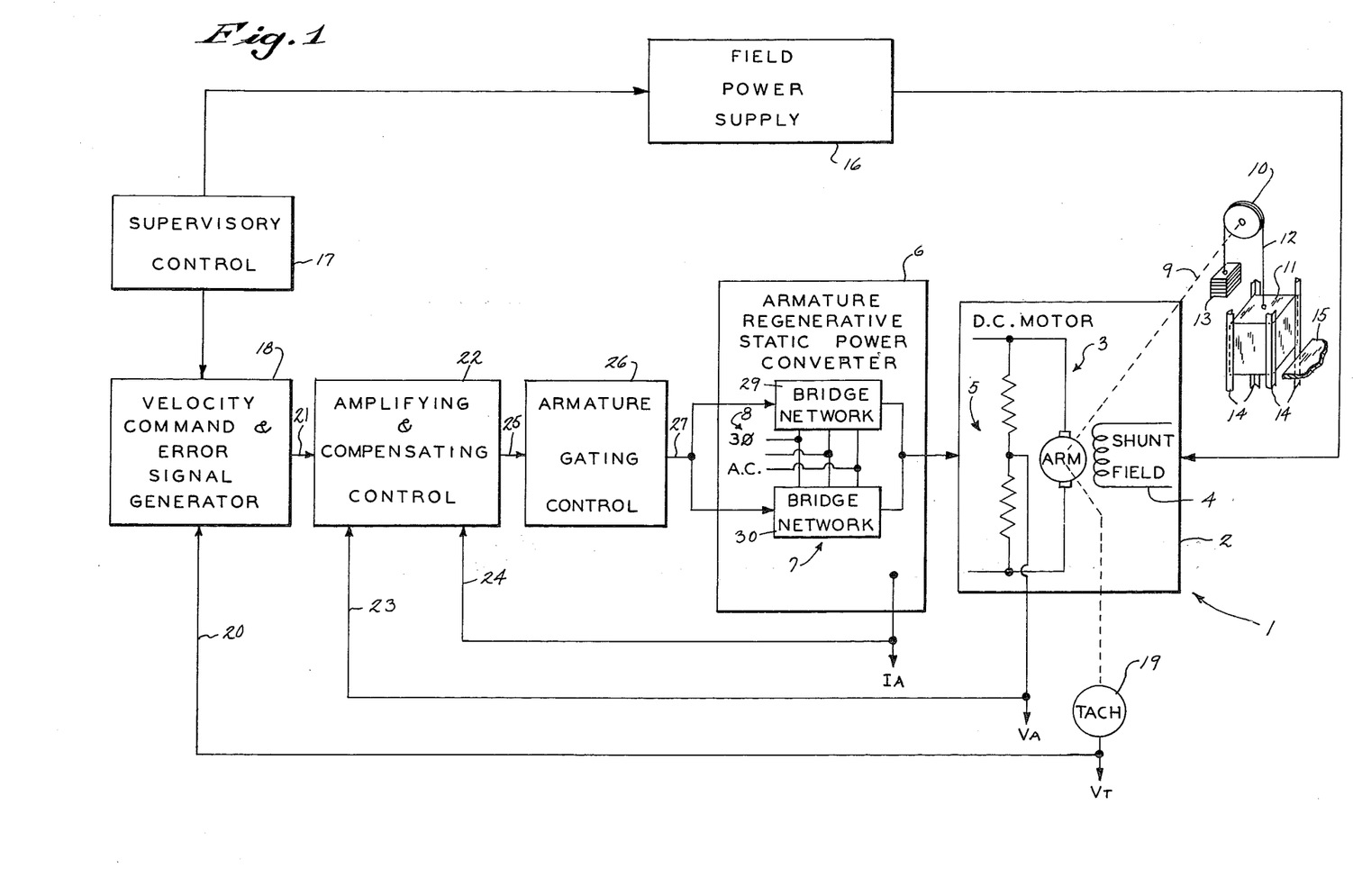
FIG. 1 is a diagrammatical block illustration of an elevator system.

Referring to the drawings and particularly FIG. 1, a transportation system includes an elevator system 1 having a direct current drive motor 2 with an armature circuit 3 and a shunt field circuit 4. The armature circuit 3 is connected through an input circuit 5 to an adjustable source 6 supplying direct current power. The direct current source 6 includes a pair of parallel connected, full-wave, controlled bridge rectifying networks 7 which are connected to a three-phase alternating current source 8 and selectively provides controlled amounts of direct current and voltage to the D.C. motor input circuit 5 and thus to the armature 3. The bridge networks 7 are selectively controlled to permit the direction of direct current flow through the armature circuit 3 to be reversed when desired to provide regenerative braking control as well as forward and reverse operation of the D.C. motor 2. The bridge networks 7 can be coupled to the source 8 in a manner as illustrated in the patents to Maynard, U.S. Pat. Nos. 3,716,771 issued on Feb. 13, 1973 and 3,683,252 issued on Aug. 8, 1972 and the patent to Maynard et al., U.S. Pat. No. 3,551,748 issued on Dec. 29. 1970.

A drive shaft 9 is diagrammatically illustrated as coupled to be rotatably driven by the armature 3 and is connected to rotate a traction sheave 10 either directly or through suitable gears (not shown). An elevator car 11 is supported by a cable 12 which is reeved over the traction sheave 10, with the other end of the cable 12 being connected to a counter-weight 13. The elevator car 11 is movably disposed in a hoist way which includes a number of guide rails 14 to provide service to a plurality of floors, such as floor 15. The movement of car 11 in its required travel between one or more floors is precisely controlled to provide a smooth and comfortable ride in a minimal amount of time by controlling the amount and direction of direct current flow to the armature 3 of the drive motor 2.

The shunt field 4 of the D.C. motor 2 is connected to a field power supply 16 which supplies energizing power to the shunt field 4 under the control of a supervisory control 17. The supervisory control 17 may desirably function to control the operation of only a single car or may be coupled to operate a plurality of cars in a known manner.

The magnitude and direction of direct current flow applied to the armature 3 by the source 6 is controlled by a velocity command and error signal generator 18 in response to a command from the supervisory control 17 and a speed signal $V_T$ supplied from a tachometer 19 through an input circuit 20. The signal generator 18 generates a speed command signal in response to the operation of supervisory control 17 which is compared or summed with the speed signal supplied on input lead 20 for providing an error output signal at the lead 21 which is supplied to an amplifying and compensating control circuit 22. The control circuit 22 is connected to a lead 23 which supplies a signal $V_A$ from the armature input circuit 5 which is proportional to the armature voltage and is further connected to a lead 24 which supplies a signal $I_A$ from the source 6 which is proportional to the armature current. Generally, the armature current signal $I_A$ and the armature voltage signal $V_A$ are supplied to the compensating circuits within the control 22 to compensate for motor operating losses while providing a continuous armature current limit. The amplifying and compensating control 22 is thus operative to supply a command signal at an output 25 to a gating control circuit 26 which is operatively coupled through an output 27 for selectively enabling the dual bridge networks 7 for providing controlled amounts of both forward and reverse direction energizing power to the armature circuit 3 according to the selective firing of certain controlled rectifiers in the networks in accordance with the phase relationships of the incoming three-phase power supply 8.

The elevator system 1 is more fully described in the copending applications of Maynard entitled "TRANSPORTATION SYSTEM WITH MALFUNCTION MONITOR" filed on Apr. 29, 1974 having Ser. No. 465,271 and "TRANSPORTATION SYSTEM WITH MOTOR FIELD CONTROL" filed on an even date herewith having Ser. No. 468,864 and such applications are incorporated by reference herein.

Figure 2:
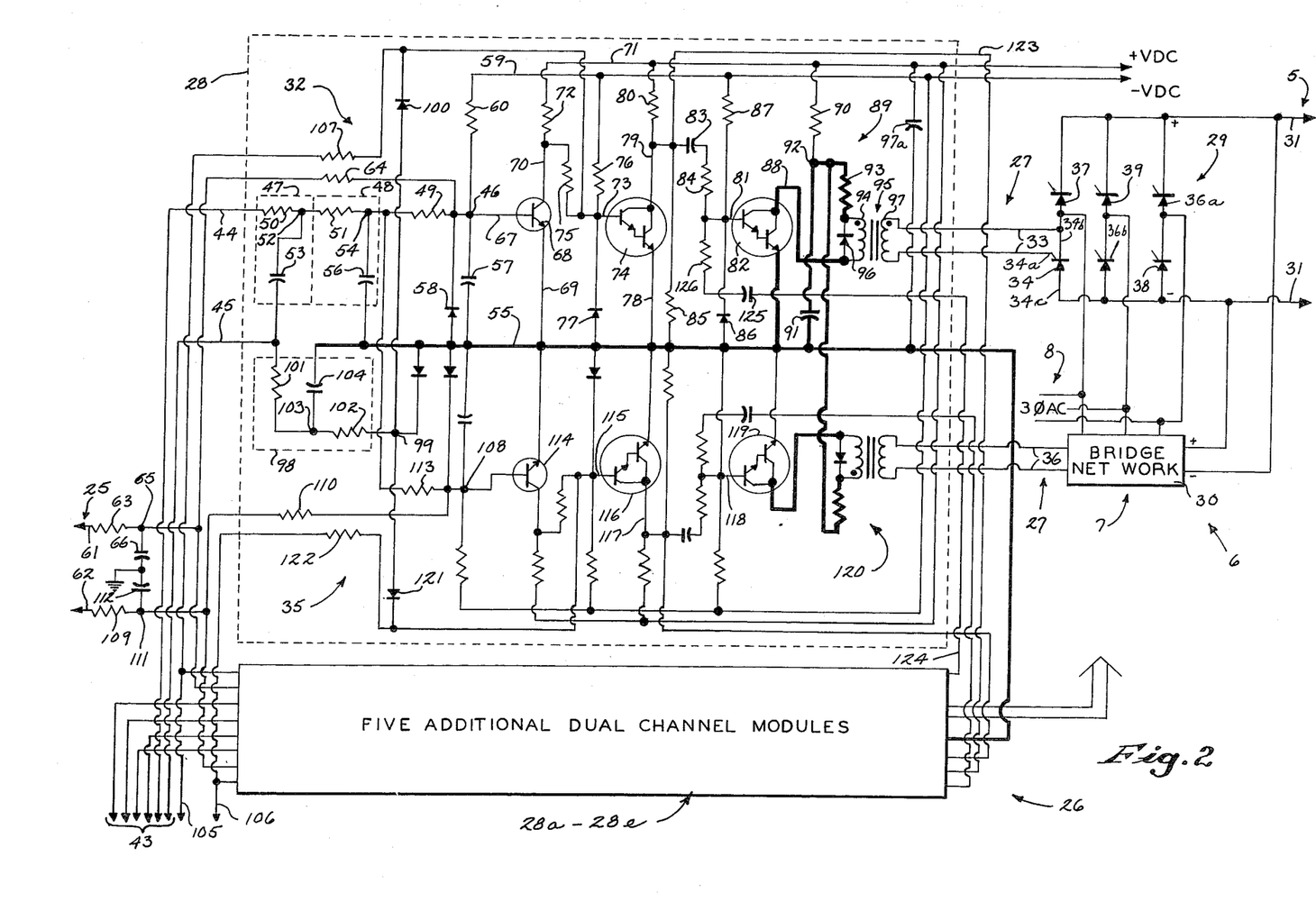
FIG. 2 is a circuit schematic showing the armature gating control of FIG. 1.
Figure 3:
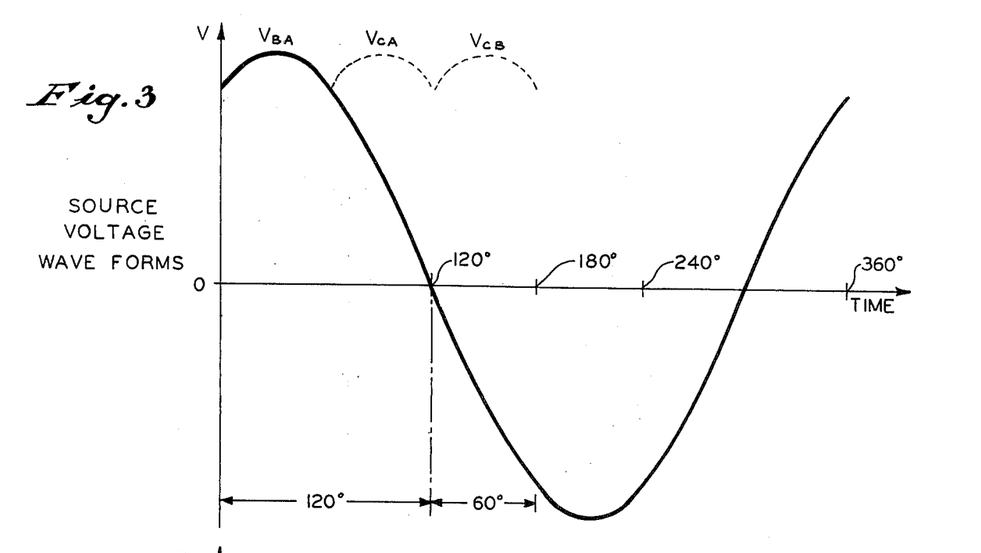
FIG. 3 is a diagrammatical graphical illustration showing the voltage waveforms of the three-phase A.C. source in FIG. 1.

The armature gating control circuit 26 shown in FIG. 2 includes six dual channel modules with one module designated as 28 and the succeeding five modules designated as 28a through 28e which are coupled to control a plurality of controlled rectifiers within a forward or first direction bridge 29 and a reverse or second direction bridge 30 for supplying controlled amounts of current to the D.C. motor 1 through the output leads 31. The six modules 28 and 28a through 28e are simularly constructed and only the module 28 will be described in detail and reference to any circuit elements within the modules 28a through 28e will be designated by identical numbers having the appropriate letter designation corresponding to the proper module.

The module 28 includes a first channel 32 providing a pair of output leads 33 connected to control the firing of a controlled rectifier 34 within the bridge network 29 with one lead directly connected to a gating circuit 34a and the other lead directly connected to a cathode circuit 34b. A second channel 35 provides a pair of leads 36 similarly connected to control the firing of a similarly situated controlled rectifier within the bridge network 30. It is further understood that the channel 32a is connected to control the conduction of a controlled rectifier 36a, the channel 32b is connected to control the conduction of the controlled rectifier 36b, the channel 32c connected to control the conduction of the controlled rectifier 37, the channel 32d connected to control the conduction of the controlled rectifier 38 and the channel 32e connected to control the conduction of the controlled rectifier 39.

The reverse direction channels 35 and 35a through 35e are coupled to control similarly situated controlled rectifiers in the bridge network 30. The controlled rectifiers in the bridge circuit 30 are constructed in an identical manner as those illustrated in the bridge circuit 29 but with the output leads of the bridge 30 parallel connected and having an inverse polarity output of the output leads from the bridge circuit 29.

The gating control signals supplied to the bridge networks 7 to render selected controlled rectifiers conductive are phase controlled in accordance with the phase sequence of the incoming three-phase alternating current input from the source 8 as sensed by a reference transformer (not shown) which is coupled to provide a plurality of phase related signals upon the input leads 43 to the modules 28 and 28a through 28e. Such phase sensing circuitry could utilize a circuit providing the input leads 43 such as shown in the U.S. Pat. No. 3,668,493 issued to J. Maynard on June 6, 1972. With specific reference to the module 28, a pair of phase input leads 44 and 45 are connected to the inputs 43 with the lead 44 supplying a phase signal $V_{AN}$ which is proportional to the alternating input voltage existing between phase A of the source 8 and a neutral potential while the lead 45 supplies a signal $V_{NA}$ which is proportional to the signal $V_{AN}$ but shifted in phase by 180 electrical degrees. The phase signal supplied upon the input lead 44 is supplied to a summing circuit 46 through a lead filter 47, a lag filter circuit 48 and a resistor 49 while the phase signal upon the lead 45 is combined with the phase signal at lead 44 at the lead filter circuit 47. Specifically, the lead 44 is connected to the resistor 49 through a series connected circuit including a resistor 50 and a resistor 51 while a junction circuit 52 connecting resistors 50 and 51 is connected to the lead 45 through a capacitor 53. A junction circuit 54 connecting resistors 49 and 51 is connected to a system ground lead 55 through a capacitor 56.

The summing circuit 46 is connected to the system ground lead 55 through a parallel connected circuit including a capacitor 57 and a diode 58. A negative voltage lead 59 is connected to a negative constant potential voltage source −VDC and to the summing circuit 46 through a resistor 60. The source −VDC could constitute a −13 volts D.C. potential from a regulated source.

Firing command signals are supplied from the amplifying and compensating control 22 as more fully described in the above mentioned copending application entitled "TRANSPORTATION SYSTEM WITH MALFUNCTION MONITOR" through a pair of leads 61 and 62. The gating command signal on lead 61 is supplied to the summing circuit 46 through a series connected circuit including a resistor 63 and a resistor 64. A connecting circuit 65 between resistors 63 and 64 is connected to the system ground through a capacitor 66. The firing command signals could also be provided by other amplifying and compensating controls such as shown in the Maynard patents including U.S. Pat. No. 3,716,771 issued on Feb. 13, 1973, U.S. Pat. No. 3,551,782 issued on Dec. 29, 1970 and U.S. Pat. No. 3,668,493 issued on June 6, 1972.

The summing circuit 46 is connected to a base circuit 67 of an NPN type transistor 68 having an emitter circuit 69 connected to the ground lead 55. A collector circuit 70 is connected to a constant positive potential lead 71 through a resistor 72 with the lead 71 connected to a positive voltage source +VDC such as +34 volts D.C. for example. The collector circuit 70 of transistor 68 is also connected to a base circuit 73 of a Darlington pair type transistor circuit 74 through a resistor 75. The base circuit 73 is also connected to the constant negative voltage lead 59 through a resistor 76 and to the system ground lead 55 through a diode 77. An emitter circuit 78 is connected to the system ground lead 55 and a collector circuit 79 is connected to the constant positive voltage lead 71 through a resistor 80.

The collector circuit 79 of the Darlington circuit 74 is also connected to a base circuit 81 of a Darlington pair type transistor circuit 82 through a serially connected capacitor 83 and a resistor 84. The collector circuit 79 is also connected to the system ground lead 55 through a resistor 85 while the base circuit 81 is connected to the system ground lead 55 through a diode 86. The base circuit 81 is also connected to the constant negative source lead 59 through a resistor 87. A collector circuit 88 of the Darlington circuit 82 is connected to the positive voltage lead 71 through an output circuit 89. The output circuit 89 includes a resistor 90 connected to the positive source lead 71 and to the system ground lead 55 through a capacitor 91. A connection circuit 92 between resistor 90 and capacitor 91 is connected to the collector circuit 88 through a resistor 93 and a primary circuit 94 of a transformer 95. A diode 96 is connected across the primary winding 94 of transformer 95. The transformer 95 provides an output winding 97 which is directly connected to the output leads 33, one of which is directly connected to the gating circuit 34a and the other to the cathode circuit 34b of the controlled rectifier 34. A capacitor 97a is connected across the positive voltage lead 71 and the system ground lead 55 for smoothing the positive biasing voltage supplied to the circuitry of FIG. 8.

The phase lead 45 is connected to a lag filter circuit 98 which, in turn, provides an output circuit 99 connected to the base circuit 73 of the Darlington circuit 74 through a diode 100. Specifically, the lead 45 is connected to the output circuit 99 through a series circuit including resistors 101 and 102 with a connecting circuit 103 therebetween connected to the system ground lead 55 through a capacitor 104. The lag filter circuit 98 is operative to provide a disable control signal through the diode 100 which is effective to disable the controlled rectifier 34 during limited periods of each cycle of source frequency as will be more fully described hereinafter.

The amplifying and compensating control 22 is also operably coupled to selectively supply disable signals to the armature gating control 26 through a pair of leads 105 and 106 with lead 105 coupled to selectively disable the channel 32 and the lead 106 coupled to selectively disable the channel 35. The leads 105 and 106 could be connected to the polarity detectors sensing an error signal such as illustrated in the above mentioned Maynard U.S. Pat. Nos. 3,716,771; 3,551,782 and 3,668,493. With reference to channel 32, the lead 105 is connected to the base circuit 73 of the Darlington circuit 74 through a resistor 107 to operatively supply disable signals thereto as will be more fully described hereinafter.

The channel 35 operatively controls a controlled rectifier within the bridge network 30 and is constructed and operates in a similar manner as the channel 32 described above and therefore need not be described in great detail. Briefly, the channel 35 includes a summing circuit 108 connected to receive a gating control signal from the lead 62 through a series connected circuit including a resistor 109 and a resistor 110. A connecting circuit 111 between the two resistors 109 and 110 is connected to the system ground through a capacitor 112. The phase reference voltage signal at the lead 54 is supplied to the summing circuit 108 through a resistor 113 with the summing circuit 108 connected to the base circuit of an NPN type transistor 114. A collector circuit of the transistor 114 is electrically coupled to control a base circuit 115 of a Darlington pair type transistor circuit 116. The Darlington circuit 116 provides a collector circuit 117 electrically coupled to control a base circuit 118 of a Darlington pair type transistor circuit 119. The Darlington circuit 119 is coupled through an output circuit 120 for selectively providing firing control pulses through the output leads 36 to render a controlled rectifier conductive within the bridge network 30. A phase controlled disable signal supplied by the output 99 is coupled to the base circuit 115 through a diode 121 while the disable lead 106 is connected to the base circuit 115 through a resistor 122.

In an important aspect of the invention, the operation of each gating channel to supply a gating pulse to an associated controlled rectifier also automatically renders another gating channel operative to supply a firing pulse to an associated controlled rectifier within the same bridge network for providing a return circuit for the energizing power supplied to the armature circuit 3. As an example, an output circuit 123 in the gating channel 32 is connected to the collector circuit 79 of the Darlington circuit 74 and conducts a firing control signal to the gating channel 32e to thereby render the controlled rectifier 39 conductive at the same time that the controlled rectifier 34 is rendered conductive by the gating signal supplied through the leads 33. In an analogous manner, the gating channel 32a provides an output circuit 124 connected through a series connected circuit including a capacitor 125 and a resistor 126 to the base circuit 81 of the Darlington circuit 82 so that a firing control command provided by the module 28a to render the controlled rectifier 36a conductive also renders the controlled rectifier 34 conductive by actuating channel 32 to provide a gating control pulse on lead 33 thereby completing a circuit for energizing the armature circuit 3.

Figure 4:
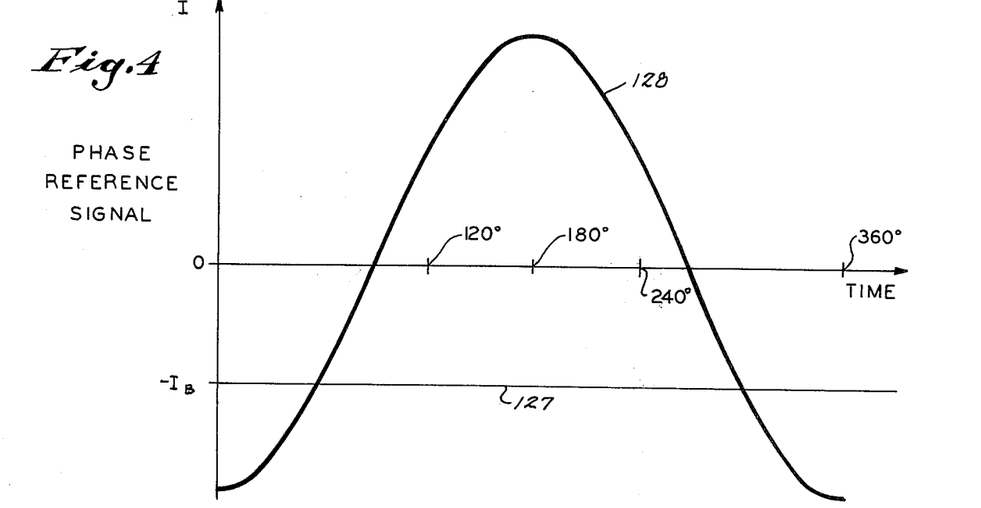
FIG. 4 is a diagrammatical graphical illustration showing a reference control waveform employed in the armature gating circuit of FIG. 2.

The operation of the armature gating control 26 for controlling the bridge networks 7 can best be described with reference to the waveforms shown in FIGS. 3 through 6. With reference to channel 32, a constant negative reference signal 127 as illustrated in FIG. 4 is supplied to the summing circuit 46 through the resistor 60 which tends to turn "off" the transistor 68 assuming that input signals have not been supplied through the resistors 49 and 64. The turning "off" of transistor 68 operatively connects the base circuit 73 to receive the positive signal at resistor 72 for turning "on" the Darlington circuit 74 which, in turn, operatively connects the signal supplied from the resistor 80 to the ground lead 55 thereby turning the Darlington circuit 82 "off." The conduction of the Darlington circuit 74 and the non-conduction of the Darlington circuit 82 operatively prevents the discharge of the capacitor 91 through the primary windings 94 of the transformer 95 and thus preventing the supply of a gating or firing pulse through the output leads 33 to the controlled rectifier 34.

In order to supply gating or firing pulses to the controlled rectifier 34 through the leads 33, the Darlington circuit 74 must be rendered non-conductive or turned "off" thereby supplying the positive signal from the resistor 80 to the base circuit 81 to render the Darlington circuit 82 conductive to permit the discharge of energy from the capacitor 91 through the primary circuit 94 and the Darlington circuit 82 to the ground lead 55. Such discharging of the capacitor 91 through the primary winding 94 is effective for inducing an output pulse in the secondary winding 97 and through the leads 33 to render the controlled rectifier 34 conductive. In order to function properly, the controlled rectifier 34 must be rendered conductive during an appropriate period of each energy cycle of the power source frequency and its duration of conduction is dependent upon the time in each source cycle it is rendered conductive by a pulse supplied through the leads 33 and the time that the controlled rectifier 34 is commutated off by the impressed source phase voltage changing polarity.

The Darlington circuit 74 can be conditioned to turn "off" to operatively supply a gating pulse to the leads 33 by the transistor 68 becoming conductive whenever the potential at the base circuit 67 becomes slightly greater than the circuit ground potential existing at the emitter circuit 69. An alternating phase reference signal 128 illustrated in FIG. 4 is supplied by the lead and lag filtering networks 47 and 48 through the resistor 49 to the summing circuit 46 and is summed with the constant negative reference signal 127. Whenever the analog output signal at the base circuit 67 from the summing circuit 46 becomes slightly positive with respect to the potential at the emitter circuit 69, the transistor 68 is rendered conductive or turns "on" to condition the Darlington circuit 74 to turn "off" and the Darlington circuit 82 "on" to supply a gating pulse to the controlled rectifier 34.

In like manner, the summing circuit 108 of the channel 35 also receives the constant negative reference signal 127 from the lead 59 and the alternating phase reference signal 128 through the resistor 113 for controlling the operation of transistor 114 to likewise condition the Darlington circuits 116 and 119 for operatively supplying a firing pulse.

Figure 5:
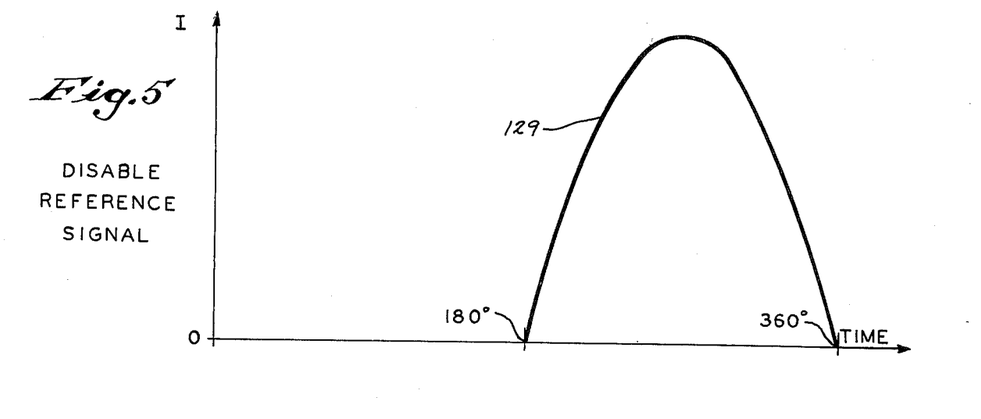
FIG. 5 is a diagrammatical graphical illustration showing a disable control waveform employed in the armature gating circuit of FIG. 2.

A disable reference signal 129 as illustrated in FIG. 5 supplied from the output circuit 99 of the lag filter 98 is supplied through the diode 100 to the base circuit 73 of the Darlington circuit 74 and through the diode 121 to the base circuit 115 of the Darlington circuit 116. The disable signal 129 has a substantial positive peak magnitude and operatively renders the Darlington circuits 74 and 116 conductive or turned "on" thereby rendering the associated Darlington circuits 82 and 119 non-conductive or turned "off" to prevent the supply of gating pulses or signals through the output leads 33 and 36. The disable signal 129 occurs between the 180 and 360 electrical degree time period of each cycle of the power supply frequency to that the controlled rectifier 34 and the similarly situated controlled rectifier in the bridge network 30 can only be selectively fired during the time period between 0 and 180 electrical degrees of the illustrated phase cycle.

Other disable signals are selectively supplied through the leads 105 and 106 to selectively render the channels 32 and 35 operative in accordance with the relative polarity of the error signal derived as a difference signal of a desired motor output and the actual sensed motor output, as more fully described in the above mentioned copending application entitled "TRANSPORTATION SYSTEM WITH MALFUNCTION MONITOR." One such disable signal is selectively supplied through the lead 106 from the amplifying and compensating control 22 to the base circuit 115 to render the Darlington circuit 116 conductive to prevent the supply of firing pulses through the output leads 36 when the error signal is of a first polarity. In a similar manner, another disable signal is selectively supplied through the lead 105 to the base circuit 73 to render the Darlington circuit 74 conductive to prevent the supply of gating pulses at the output lead 33 when the error signal is of a second polarity. The channels 32 and 35 are thus selectively enabled or disabled in accordance with the relative polarity of the error signal to provide the proper forward or reverse direction motoring or regenerating operation.

The exact point in time during each phase alternating cycle that firing pulses, if any, are supplied through the output leads 33 and 36 is controlled by the selectively variable positive control signals supplied through the resistor 64 to the summing circuit 46 and through the resistor 110 to the summing circuit 108. The magnitude of such positive command signals supplied to the summing circuits 46 and 108 are provided by the amplifying and compensating control 22 in accordance with the commanded or desired amount of energy to be supplied from the controllable source 6 to the armature circuit 3 of the D.C. motor 2. Such command signals are based upon the above described formulated error signal which has been compensated for armature current losses and an armature current limit as more fully described in the copending application entitled "TRANSPORTATION SYSTEM WITH MALFUNCTION MONITOR."

With reference to channel 32, an increased positive magnitude of the control signal supplied to the summing circuit 46 through the resistor 64 is effective for providing a firing control pulse to the controlled rectifier 34 at an earlier period of time during each alternating phase cycle to permit an increased amount of energy to flow through the armature circuit 3. Thus as illustrated by the phase signal $V_{BA}$ in FIG. 3, the gating module 28 will provide a maximum of 180 electrical degrees of motoring control and 60 electrical degrees of regenerative control.

In an important aspect of the invention, the turning "off" of the Darlington circuit 74 which is operative to supply a gating pulse to the controlled rectifier 34 is effective for connecting the positive signal supplied through the resistor 80 to the output lead 123 and thru to the base circuit 81e within the channel 32e which is effective for turning the Darlington circuit 82e "on" to supply a gating control pulse to the controlled rectifier 39. The simultaneous conduction of the controlled rectifiers 34 and 39 provide a complete circuit to supply energizing current to the armature circuit 3. In a similar manner, the operation of the gating control channel 32a to supply gating pulses to the controlled rectifier 36a is effective for supplying a positive signal through the lead 124 to the base circuit 81 thus rendering the Darlington circuit 82 conductive for supplying a gating pulse to render the controlled rectifier 34 conductive. In such situation, the conduction of the controlled rectifier 36a in response to the operation of channel 32a is also effective for rendering the controlled rectifier 34 conductive to complete an energizing circuit to energize the armature circuit 3.

The gating control provides a highly desirable safe construction in that an accidental or abnormal disconnection of the leads 61 and 62 would not result in a large armature current being supplied by the static source 6. In such a circumstance, the transistors 68 and 114 would remain turned "off" because of the negative reference signal 127 supplied from the lead 59 to the respective base circuits and the Darlington circuits 74 and 116 would remain turned "on" because of the turning "off" of transistors 68 and 114 and because of the disable signal 129 selectively supplied during alternate half cycles through the diodes 100 and 121, respectively. Such conditioning of the gating control circuit 26 thus responds to an open circuit at the input leads 61 and 62 to prevent gating pulses from being supplied to the bridge network 7.

The voltage divider relationship provided by the resistors 80 and 85 connected to the collector circuit 79 of the Darlington circuit 74 provides a highly desirable protective feature for the Darlington circuit 74 from any abnormal variances in the positive power supply from the source +VDC through the lead 71. Such a circuit construction utilizing the resistors 80 and 85 permits the source input +VDC to be unregulated thereby eliminating the necessity of employing Zener diodes or the like.

Another highly desirable feature of the gating control 26 is provided by the direct connection of the output leads 33 from the transformer secondary winding 97 to the gate and cathode circuits 34a and 34b of the controlled rectifier 34. An insulated secondary winding 97 is employed with insulated leads 33 to provide a low impedance output circuit. Such direct connection also eliminates steering diodes to provide the proper firing for two of the controlled rectifiers or a transformer output having two or more windings for connection to two or more controlled rectifiers. The employment of the low impedance output thus eliminates the requirement for connecting a capacitive circuit across the gate and cathode circuits 34a and 34b of the controlled rectifier. The highly desirable low impedance and high voltage output provides greater noise immunity than other systems for efficiently controlling the operation of the controlled rectifiers in the bridge networks 7.

Various modes of carrying out the invention are contemplated as being within the scope of the following claims particularly pointing out and distinctly claiming the subject matter which is regarded as the invention.

I claim:

1. A motor control circuit for energizing a D.C. motor from a polyphase power supply to maintain a regulated motor output by a gating system for a plurality of individual rectifier means connected to said power supply in a full-wave rectifying system wherein each of said rectifier means is selectively fired during a given half cycle of alternating current input and commutates during the successive half cycle of the alternating current input; the improvement in pulse generating means for gating of the individual rectifier means comprising a plurality of gating control channels each operative for supplying a gating pulse to one of said rectifier means with each of said channels including first switching means having first input means operatively receiving a selectively variable firing control signal from command means and first output means selectively operable from a first condition to a second condition in response to said firing control signal and connected to second input means of second switching means having second output means selectively operable from a first condition to a second condition in response to said second condition of said first switching means, said second output means providing said second condition to operatively supply an output pulse to said associated rectifier means, said first output of said first switching means of each channel connected to second input means of second switching means of one other channel for operating said other channel and supplying an output pulse to the associated rectifier means of said other channel.

2. The circuit of claim 1, wherein each of said second output means includes energy storage means operatively connected to a primary winding of an output transformer having an output winding connected to selectively supply said output pulse to said associated rectifier means.

3. The circuit of claim 2, wherein each of said rectifier means includes a gating circuit and a cathode circuit, and said second output means includes a pair of conducting leads connected to said output winding and directly connected to said gating and cathode circuits.

4. The circuit of claim 1, wherein said motor control circuit includes signal-forming means establishing an error signal related to an output of said motor and a desired output and selectively providing an enable signal and a disable signal to said first input means of each of said channels in response to the polarity of said error signal and selectively enabling and disabling said channels in response to said sensed error signal polarity.

5. The circuit of claim 1, wherein said motor control circuit includes disable means connected to said source and selectively supplying a disable signal to said first input means to selectively disable each channel in response to the relative phase relationship of said polyphase supply.

6. The circuit of claim 5, wherein said disable means includes a lag filter network.

7. The circuit of claim 1, wherein each of said channels includes third switching means having third input means receiving said selectively variable firing control signal and third output means connected to said first input means and operable from a first condition to a second condition in response to said control signal and conditioning said channel to supply an output pulse.

8. The circuit of claim 7, wherein said third input means for each channel includes summing means receiving said firing control signal and reference means connected to said polyphase supply and supplying an alternating reference signal to said summing means in response to the relative phase relationship of said polyphase supply, said third switching means selectively operating from said first condition to said second condition in response to the relative relationship between said firing control signal and said alternating reference signal.

9. The circuit of claim 8, wherein said reference means operatively supplies a constant reference signal to said summing means, said third switching means selectively operating from said first condition to said second condition in response to the relative relationship between said firing control signal and said alternating and constant reference signals.

10. The circuit of claim 7, wherein said reference means includes a lead filtering network coupled to said power supply and connected to said summing means through a lag filtering network.

11. The circuit of claim 7, wherein said third input means for each channel includes summing means receiving said firing control signal and reference means supplying a constant reference signal to said summing means, said third switching means selectively operating from said first condition to said second condition in response to the relative relationship between said firing control signal and said constant reference signal.

12. A motor control circuit for energizing a D.C. motor from a polyphase power supply to maintain a regulated motor output by a gating system for a plurality of individual rectifier means connected to said power supply in a full-wave rectifying system wherein each of said rectifier means is selectively fired during a given half cycle of the alternating current input and commutates during the successive half cycle of the alternating current input; the improvement in a pulse generating means for gating of the individual rectifier means comprising a plurality of gating control channels each operative for supplying a gating pulse to one of said rectifying means having a cathode circuit and a gating circuit, each of said channels including a first switching circuit having a first input circuit operatively receiving a selectively variable firing control signal and a first output circuit selectively operable from a first condition to a second condition in response to said firing control signal and connected to a second input circuit of a second switching circuit having a second output circuit connected to a primary winding of an output transformer having an output winding directly connected to said gating and cathode circuits by first and second insulated leads and an energy storage capacitor operatively coupled to said primary winding, said second switching circuit operating from a first condition to a second condition and conducting energy from said storage capacitor through said primary winding and supplying said gating pulse to said gating circuit in response to the condition transfer of said first switching circuit, said first output circuit of said first switching circuit of each channel connected to a second input of a second switching circuit of another channel to operatively supply a gating pulse to a gating circuit of another rectifier means in response to said condition transfer of said first switching circuit.

13. The circuit of claim 12, wherein said first switching circuit includes a switching transistor having a base circuit operatively responding to said firing control signal and a collector circuit connected to said second input circuit and to a voltage dividing circuit including a first impedance connected to an unregulated voltage source and a second impedance connected to a reference potential.

14. The circuit of claim 13, wherein said second switching circuit includes a Darlington pair transistor circuit operating as a NOR circuit and having a base circuit connected to said voltage dividing circuit.

15. The circuit of claim 12, wherein said control circuit includes signal-forming means establishing an error signal related to an actual motor output and a desired output and selectively supplying an enable signal and a disable signal to said first input circuit of each channel in response to the sensed relative error signal polarity of each channel including disable means connected to said polyphase supply and to said first input circuit through a lag filter network and supplying a disable signal in response to the relative polarity of a phase of said supply and a third switching circuit having a third input circuit including a summing circuit operatively connected to respond to said error signal by receiving said firing control signal and receiving an alternating reference signal from said power supply through a lead and lag filtering network and a constant reference signal from a constant potential source.

* * * * *

UNITED STATES PATENT AND TRADEMARK OFFICE
CERTIFICATE OF CORRECTION

PATENT NO. : 3,914,674
DATED : October 21, 1975
INVENTOR(S) : John T. Maynard

It is certified that error appears in the above-identified patent and that said Letters Patent are hereby corrected as shown below:

| | |
|---|---|
| Front page of patent in the title, | Cancel "REACTIFIER" and substitute therefor ---RECTIFIER---; |
| Column 1, Line 2, In the title | Cancel "REACTIFIER" and substitute therefor ---RECTIFIER---; |
| Column 7, Line 46, | Cancel "nection" and substitute therefor ---necting---; |
| Column 11, Line 10, | Cancel "thru" and substitute therefor ---thus---; |
| Column 14, Line 45, | After "third" insert ---output circuit connected to said first input circuit and a third---. |

Signed and Sealed this fifteenth Day of June 1976

[SEAL]

Attest:

RUTH C. MASON
Attesting Officer

C. MARSHALL DANN
Commissioner of Patents and Trademarks